April 5, 1960  J. M. GWINN, JR  2,931,446
RIPPER ATTACHMENT
Filed Nov. 28, 1956  2 Sheets-Sheet 2
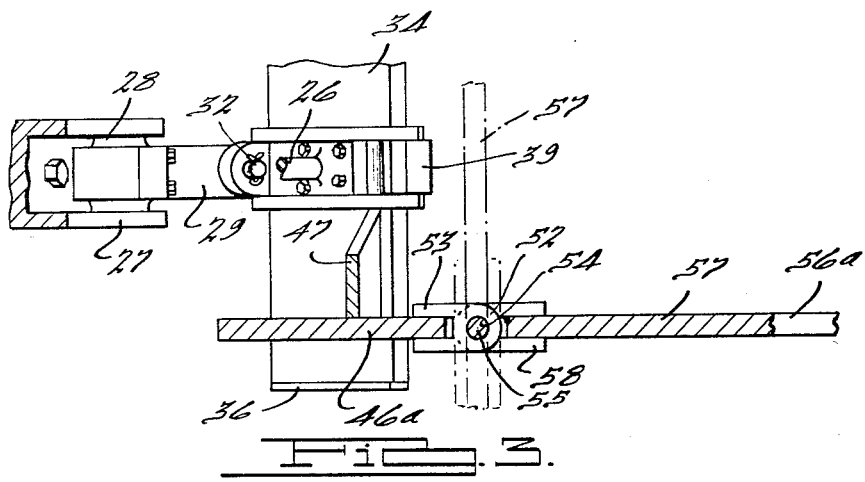
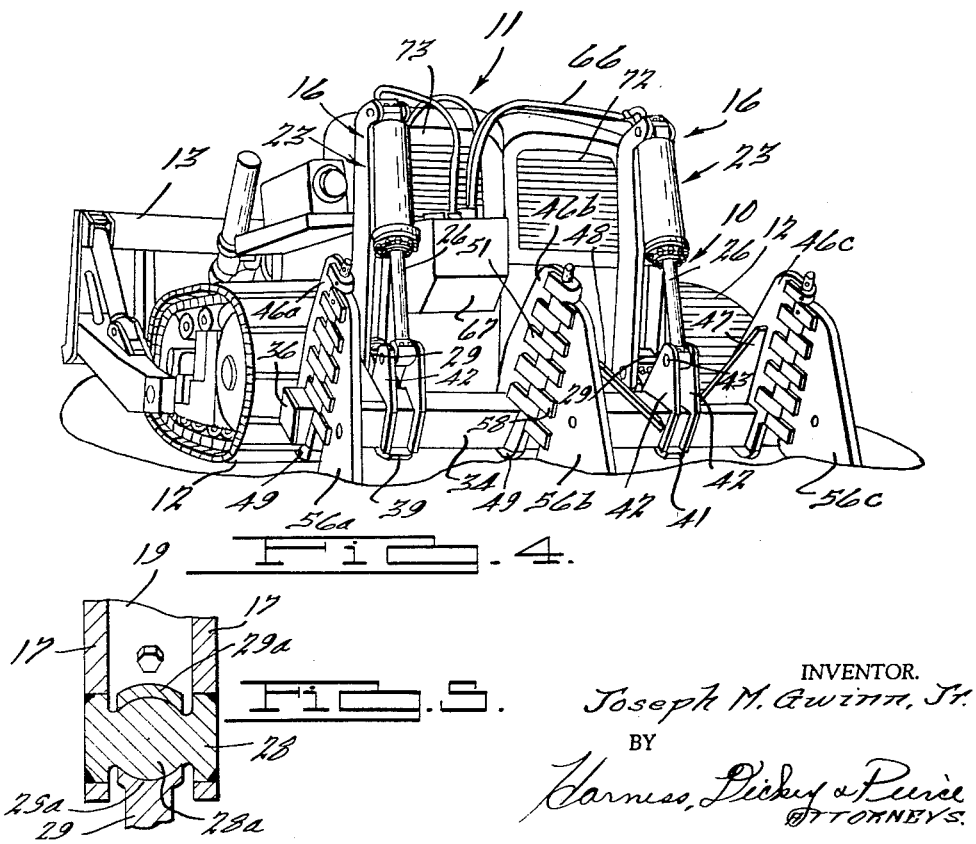
INVENTOR.
Joseph M. Gwinn, Jr.
BY
Harness, Dickey & Pierce
ATTORNEYS.

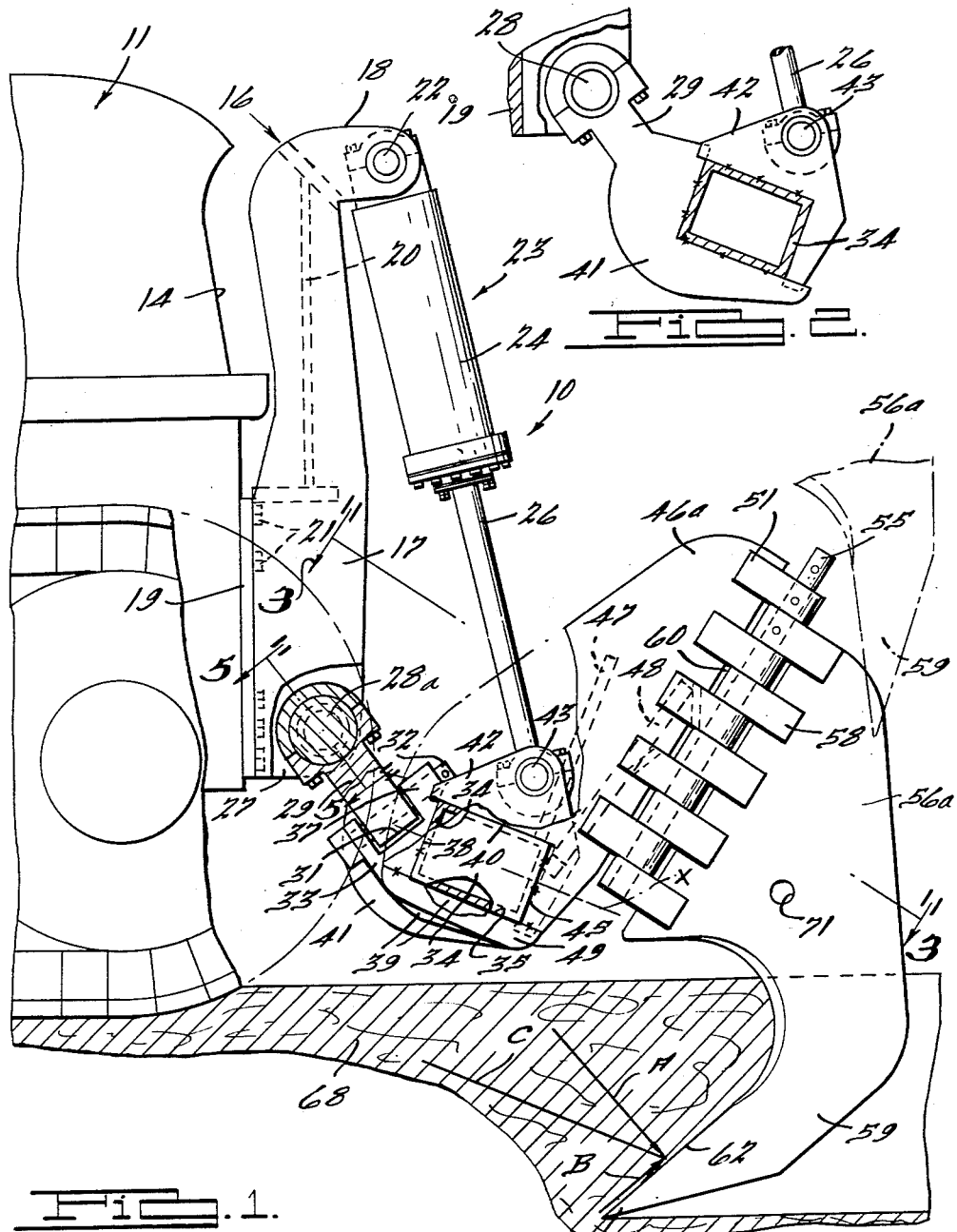

United States Patent Office 2,931,446
Patented Apr. 5, 1960

2,931,446

RIPPER ATTACHMENT

Joseph M. Gwinn, Jr., Dearborn, Mich., assignor to Gar Wood Industries, Inc., a corporation of Michigan Application November 28, 1956, Serial No. 624,857

2 Claims. (Cl. 172—464)

This invention relates generally to ground working apparatus and more particularly to a ripper attachment for a vehicle such as a crawler tractor.

In earth moving and excavating operations, the work is performed more efficiently if the earth is continuously maintained in a loose condition. From a cost standpoint, of course, this earth loosening work is preferably accomplished without the necessity for additional vehicle units. Accordingly, ground penetrating blades are preferably attached to the familiar crawler tractors used in any earth moving operation. These tractors are commonly provided with the usual dozer blades and may be used for a number of purposes incident to earth moving operations. Such a tractor when provided with ripper blades can then be operated to loosen the earth when necessary and in between the usual tractor operations. However, in order to be able to use ripper blades to their fullest extent, the blades must not interfere with the normal maneuverability of the tractor. This can best be accomplished if the earth ripping blades are mounted for free swinging movement behind the tractor so as not to interfere with the normal turning of the tractor during ripping.

A primary object of this invention, therefore, is to provide an improved ripper attachment which includes the above desired features.

A further object of this invention is to provide a ripper attachment for a tractor which includes ground engaging blades supported on and positioned rearwardly of a tractor mounted tool bar for free swinging movement rearwardly of the tractor.

Another object of this invention is to provide a ripper attachment having ground engaging blades which are attached to a supporting structure by means of upright hinge connections to provide for pivoting of the blades in horizontal directions.

A further object of this invention is to provide a ripper attachment in which the blades are connected to the support therefor by means of hinge connections which provide for a ready adjustment of the vertical positions of the blades relative to the support for regulating the extent of ground penetration of the blades.

Another object of this invention is to provide a ripper attachment which includes ground penetrating blades supported on a tool bar which is arranged in a predetermined position relative to the working sides of the ground penetrating portions of the blades so that the bar can be formed of a minimum size and weight.

Still another object of this invention is to provide a ripper attachment for a vehicle which is simple in construction, economical to manufacture, and efficient in operation in working ground of substantially any character.

Further objects, features and advantages of this invention will become apparent from a consideration of the following description when taken in connection with the accompanying drawing in which:

Fig. 1 is a fragmentary side elevational view of a rear end portion of a crawler tractor, showing the ripper attachment of this invention in assembly relation therewith;

Fig. 2 is a fragmentary detail sectional view of a portion of the ripper attachment of this invention;

Fig. 3 is a fragmentary sectional view looking along the line 3—3 in Fig. 1;

Fig. 4 is a perspective-view of a crawler tractor having the ripper attachment of this invention mounted thereon, and showing the attachment in a position in which the blades therefor extend into the ground; and Fig. 5 is a fragmentary sectional view looking along the line 5—5 in Fig. 1.

With reference to the drawing, the ripper or ground working attachment of this invention, indicated generally at 10, is illustrated in Figs. 1 and 4 in assembly relation with a crawler tractor 11 having the usual side tracks 12. A dozer blade 13 (Fig. 4) is mounted on and arranged forwardly of the front end of the tractor 11 in the usual manner. The attachment 10 is mounted at the rear end 14 of the tractor 11 as illustrated in Figs. 1 and 4.

The attachment 10 includes a pair of upright supporting brackets 16 (Fig. 4) each of which includes a pair of parallel upright arms 17, each of which is of an irregular shape and has a rearwardly extending portion 18 at the upper end thereof. The arms 17 in each bracket 16 are connected together by braces 20 and by upright plates 19 which are in turn secured by bolts 21 to the rear end 14 of the tractor at positions adjacent to and inwardly of the tracks 12. Pivotally supported on pivot pins 22 extended between the end portions 18 in each pair of plates 17 are a pair of hydraulic cylinder assemblies 23 corresponding to the brackets 16. Each assembly 23 includes a cylinder member 24 which is pivotally supported on the corresponding pivot pin 22 and a piston rod 26 which extends downwardly from the cylinder 24.

The lower ends 27 of the brackets 16 carry pivot pins 28 extended transversely of the tractor for pivotally supporting a pair of rearwardly extended arms 29.

Each pin 28 has a substantially spherical intermediate portion 28a (Fig. 5) which is positioned within a complementary shaped socket 29a at the front end of the corresponding arm 29. As a result, a universal joint type of connection is provided for each arm 29 and bracket 16. The connection of the assemblies 23 to the brackets 16 is of the same type and is, therefore, not illustrated in detail. As best appears in Fig. 1, one of the arms 29 is pivotally supported at its rear end 31 on an upwardly and rearwardly inclined pivot pin 32 carried by a bracket or body member 33 secured to an elongated tool bar 34 extended transversely of and arranged rearwardly of the tractor 11.

The tool bar 34 is of a hollow rectangular construction, having its ends closed by end plates 36, only one of which is illustrated. The body member 33 is of an irregular shape, having a first bifurcated portion 37 abutted against the front side 38 of the tool bar 34 and a second rearwardly extending portion 39 positioned against the lower side 35 of the tool bar 34 (Figs. 1 and 4). The arm 29 for the other bracket 16 (Fig. 2) terminates in a heavy web 41 secured, as by welding, to the front and bottom sides of the tool bar 34.

Corresponding to the arms 29, are pairs of upright ears or plates 42, with one pair of plates 42 being secured to the body member 33 and the other pair being secured to the web 41. The first pair of plates 42 (Fig. 1) are arranged on opposite sides of the body member 33 and are welded to the top and rear sides 40 and 45, respectively, of the tool bar 34. Each plate 42 is overlapped with and secured at its ends to the body member 33.

The other pair of plates 42 are similarly secured to the bar 34 and the web 41 and are arranged on opposite sides of the web 41 as shown in Fig. 2.

The terminal ends of the piston rods 26 are positioned between corresponding pairs of plates 42 and are pivotally connected to pivot pins 43 carried thereby. The pivot pins 43 are likewise provided with substantially spherical portions (not shown) to provide for a universal type connection of the piston rods 26 to the plates 42 like the connection of the arms 29 (Fig. 5) to the brackets 16. As a result, on operation of the assemblies 23 to retract the piston rods 26, the tool bar 34 is swung upwardly about the pivots 28. Likewise, on extension of the piston rods 26, the tool bar 34 is moved downwardly about the pivots 28.

Mounted in a spaced relation on the tool bar 34 are three upright blade supporting plates 46a, b and c. The end plates 46a and c are maintained in upright positions by gusset plates 47 carried by the tool bar 34 and secured to the plates 46a and c. A brace bar 48 secured to the tool bar 34 and the central supporting plate 46b performs a similar function for the plate 46b. Straps 49 secured to and extended across the bottom side of the tool bar 34 are secured to the lower ends of the plates 46a, b and c to further insure a rigid support of the plates on the tool bar 34.

Each of the plates 46a, b and c, is provided with rearwardly extending lugs or fingers 51 spaced apart in vertical directions amounts corresponding to the thickness of the lugs 51. Each lug 51 (Fig. 3) has a curved or rounded body portion 52 provided with an axial opening 54 and a pair of parallel leg portions 53. The leg portions 53 are positioned on opposite sides of and secured to the corresponding plate 46a, b or c.

Corresponding to the supporting plates 46a, b and c, are three blade members 56a, b and c, each of which includes a plate portion 57 provided with forward extending lugs 58 which are similar in size and spacing to the lugs 51 on the supporting plates 46a, b and c. Each blade 56a, b and c also includes a downwardly extended tooth portion 59 having a pointed end 61 and a working side or surface 62 which is inclined downwardly and forwardly in the ground engaging position of the blade illustrated in Fig. 1.

In mounting a blade 56a, b or c on its corresponding plate 46a, b and c, respectively, the lugs 58 on the blade are inserted in the spaces 60 between the lugs 51 on the supporting plate therefor. The blade and plate are then relatively manipulated to align the lug openings 54 and an elongated pin 55 is inserted through the openings 54. By varying the space 60 in which a particular lug 58 is positioned it is apparent that the vertical positions of the blades 56a, b and c in the extended positions of the piston rods 26 can readily be adjusted. In other words, to raise the blade 56a one increment, each lug therefor is moved to the space 60 immediately above the space 60 in which it was last located.

The assembly of the lugs 51 and 58 with the pins 55 provides for a hinged connection of each of the blades 56a, b and c with its corresponding supporting plate 46a, b and c. Since the hinge connections are positioned rearwardly of the tool bar 34, each blade is swingable ninety degrees to either side of its rearwardly extended position, as illustrated in Fig. 3 for the blade 56a.

In the use of the attachment 10 with the tractor 11, the hydraulic cylinder assemblies 23 are connected, in well known manner, by flexible lines 66 to a fluid reservoir 67 mounted on the rear end 14 of the tractor 11. The reservoir 67 is in turn connected, likewise in a well known manner, to a conventional hydraulic pump (not shown) provided on the tractor 11. A control valve (not shown) associated with the pump and the reservoir 67 is operable to provide for an application of fluid pressure to the hydraulic cylinder assemblies 23 so that the piston rods 26 are extended to move the tool bar 34 and the blades 56a, b and c downwardly.

To move the blades 56a, b and c into the ground the piston rods 26 are extended concurrently with forward travel of the tractor 11 so that the downward pressure of the piston rods 26, and the inclination of the working sides 62 cooperate to provide for a progressive movement of the blade tooth portions 59 into the ground. When the piston rods 26 have been fully extended, the tooth portions 59 have been ground submerged and the blades 56a, b and c have been lowered to the fullest extent permitted for each supported position of the blades on the supporting plates therefor.

As illustrated in Fig. 1, when the blade 56a is thus projected into the ground, indicated at 68, the working side 62 of the tooth portion 59 is inclined downwardly and forwardly. As a result, the normal pressure of the earth on the side 62 of the tooth 59, during forward travel of the blade 56a, is in a direction substantially normal to the side 62 and is represented diagrammatically by a force vector A. The frictional force on the side 62 incident to the pressure force A is represented by the vector B, and for structural design purposes is assumed to be one-half the pressure force A.

The resultant force of the earth on the side 62, therefore, is in the general direction illustrated by the line C. As clearly appears in Fig. 1, the line C is substantially parallel to the downwardly and rearwardly inclined bottom and top sides 35 and 40 of the tool bar 34 and is, therefore, also parallel to the principal axis of inertia of the tool bar 34, indicated at X in Fig. 1, which is in the direction of maximum strength for the tool bar 34. It is apparent, of course, that while the tool bar 34 has been illustrated as being rectangular, any desired cross sectional shape, such as an elliptical shape, could be utilized so long as such shape had its principal axis of inertia substantially parallel to the force C. Consequently, the bending stresses in the tool bar 34 resulting from the bending forces exerted by the blades 56a, b and c on the tool bar 34, which is supported at the arms 29, are reduced to a minimum.

It is seen, therefore, that the relative arrangement of the sides 62 of the blade tooth portions 59 and the tool bar 34 provide for the forming of the tool bar of a minimum size and weight without sacrificing any of the strength requirements.

During forward travel of the tractor 11, the blades 56a, b an c are maintained at the level illustrated in Fig. 1 by hydraulically locking the assemblies 23 in the fully extended positions of the piston rods 26. Each blade is designed for taking the full drawbar thrust of the tractor so that there is no danger of blade breakage. In one commercial embodiment of the invention each blade is about five feet in length and about two inches thick.

As the tractor 11 moves forwardly through a field or excavation, the blades 56a, b and c operate continuously to rip up the ground and, therefore, loosen the ground material. A blade is also free to move to one side or another on contact with an immovable obstruction so that the blades are not readily damaged. In other words, each blade is free to follow the path of least resistance through the dirt, clay, rock or the like.

To move the attachment 10 to a transport position, illustrated in dotted lines in Fig. 1 for the blade 56a, the hydraulic cylinder assemblies 23 are operated to retract the piston rods 26 and swing the tool bar 34 upwardly about the pivot pins 28. The piston rods 26 are then held in such retracted positions, by manipulation of the control valve associated with the reservoir 67, until it is again desired to move the blades to ground working positions.

By virtue of the mounting of the blades 56a, b and c for free pivoting movement to positions extended transversely of the direction of movement of the tractor 11, or in other words, to positions at right angles to their normal rearwardly extended positions, the blades 56a, b and c do not interfere with maneuverability of the tractor 11 during ripping. In other words, the blades do not tend to steer the tractor. The blades 56a, b and c exert substantial downward forces on the tractor tracks 12 and act like rudders. As a result, the usual blades are capable of interfering with normal manipulation and turning of the tractor 11. However, by virtue of the pivotal support of the blades for substantially one hundred and eighty degree swinging movement the tractor 11 may be turned sharply without raising the blades and without the blades affecting the turn.

The effect of the blades on turning of the tractor 11 is further minimized by the upward and rearward inclination of the pivot pins 55 since on pivoting a blade is also moved upwardly to progressively higher positions in the ground. The inclination of the pins 55 also provides for the positioning of the blade tooth portions close behind the tractor to reduce the size of the attachment while maintaining the pivot axes behind the tool bar 34 for maximum blade pivoting. This is accomplished while keeping the size and shape of the blades within practical limits.

Some of the "twin-type tractors," such as the Model "TC 12" manufactured by the Euclid Division of General Motors Corporation of Detroit, Michigan, illustrated in the drawing, are constructed so that during movement of the tractor over uneven ground there is some relative up and down movement between the rear faces 72 and 73 of the side by side tractor portions. Consequently, each pair of pivots 22, 28 and 43 move up and down relative to each other so that the distance between each pair of pivots varies. The universal type of joint connections provided at each of these pivots along with the mounting of one of the arms 29 on the inclined pivot 32 provides for a relative movement of the parts of the attachment 10 during such tractor movement to thus accommodate the attachment 10 to the tractor 11.

To move the blades 56a so as to adjust the depth of cut of the teeth 59, a crane or the like (not shown), may be used to lift the blades after the pivot pins 55 have been removed. An opening 71 in each blade facilitates the connection of a lifting tool with the blade. The blades 56a, b and c are then manipulated relative to their corresponding supports 46a, b and c so that the lugs 58 are inserted between the lugs 51 on the supports 46a, b and c at positions to either raise or lower the blades as desired. It is apparent that by virtue of the support of the blades on the pins 55, the inclination of the blade sides 62, when the blades are lowered into the ground, is the same for any depth adjustment of the blades.

In the event a crane is not available to lift the blades 56a, b and c, the blades are lowered into the ground, the pins 55 are removed, and the tractor is manipulated along with the cylinder assemblies 23 to move the supporting plates 46a, b and c into desired positions relative to the blades 56a, b and c. After the lug openings 54 have been aligned the pins 55 are re-inserted.

Although the invention has been described with respect to a preferred embodiment thereof, it is to be understood that it is not to be so limited, since changes can be made therein which are within the scope of the invention as defined by the appended claims.

What is claimed is:

1. A ground working attachment for a twin-type tractor having rear end portions arranged side by side and movable up and down relative to each other, said attachment comprising a pair of upright brackets adapted to be secured to said rear portions, an elongated tool bar adapted to be arranged rearwardly of said tractor at a position extending transversely thereof, a pair of arm members carried by said tool bar and extending forwardly therefrom, one of said arm members being rigidly connected to said tool bar and the other arm member being pivotally supported on the tool bar for swinging movement longitudinally thereof, ball and socket type joints connecting the forward ends of said arms and said brackets, a pair of lift units supported on said brackets at positions above said arms and connected to said tool bar for moving the tool bar up and down, an upright ripper blade disposed rearwardly of said tool bar and having a lower tooth portion adapted to be moved through the ground, an upright supporting member for said blade secured to said tool bar, and upwardly and rearwardly extending pivot means mounting said blade on said supporting member so that upon pivoted movement of said blade in either direction from a position substantially perpendicular to said tool bar when said tooth portion is in the ground, said tooth portion is moved upwardly.

2. A ground working attachment for a twin-type tractor having rear end portions arranged side by side and movable up and down relative to each other, said attachment comprising a pair of brackets adapted to be secured to said rear portions, an elongated tool bar adapted to be arranged rearwardly of said tractor at a position extending transversely thereof, a pair of arm members carried by said tool bar and extending forwardly therefrom, one of said arm members being rigidly connected to said tool bar and the other arm member being pivotally supported on the tool bar for swinging movement longitudinally thereof, ball and socket type joints connecting the forward ends of said arms and said brackets, a pair of lift units supported on said brackets at positions above said arms and connected to said tool bar for moving the tool bar up and down, and an upright ripper blade disposed rearwardly of and mounted on said tool bar.

References Cited in the file of this patent

UNITED STATES PATENTS

| | | |
|---|---|---|
| 1,026,397 | Bradshaw | May 14, 1912 |
| 1,225,853 | Pidgeon | May 15, 1917 |
| 2,199,674 | Ronning | May 7, 1940 |
| 2,557,443 | Leanord | June 19, 1951 |
| 2,674,169 | Sawyer | Apr. 6, 1954 |
| 2,769,625 | Wooldridge | Nov. 6, 1956 |
| 2,797,629 | Kelley | July 2, 1957 |
| 2,828,968 | Engler | Apr. 1, 1958 |